United States Patent
Yang et al.

(10) Patent No.: US 11,966,829 B2
(45) Date of Patent: Apr. 23, 2024

(54) CONVOLUTIONAL ARTIFICIAL NEURAL NETWORK BASED RECOGNITION SYSTEM IN WHICH REGISTRATION, SEARCH, AND REPRODUCTION OF IMAGE AND VIDEO ARE DIVIDED BETWEEN AND PERFORMED BY MOBILE DEVICE AND SERVER

(71) Applicant: WAI CORP., Shinjuku (JP)

(72) Inventors: Seung-ho Yang, Hwasun-gun (KR); Sang-joon Han, Incheon (KR)

(73) Assignee: WAI CORP., Tokyo (JP)

( * ) Notice: Subject to any disclaimer, the term of this patent is extended or adjusted under 35 U.S.C. 154(b) by 254 days.

(21) Appl. No.: 16/755,521

(22) PCT Filed: Oct. 12, 2018

(86) PCT No.: PCT/KR2018/012022
§ 371 (c)(1),
(2) Date: Apr. 10, 2020

(87) PCT Pub. No.: WO2019/074316
PCT Pub. Date: Apr. 18, 2019

(65) Prior Publication Data
US 2022/0292328 A1 Sep. 15, 2022

(30) Foreign Application Priority Data
Oct. 12, 2017 (KR) .......................... 10-2017-0132692

(51) Int. Cl.
*G06N 3/04* (2023.01)
*G06V 10/00* (2022.01)
(Continued)

(52) U.S. Cl.
CPC ............... *G06N 3/04* (2013.01); *G06V 10/00* (2022.01); *G06V 10/70* (2022.01); *G06V 10/82* (2022.01); *G06F 2209/5011* (2013.01)

(58) Field of Classification Search
CPC .......... G06N 3/04; G06V 10/00; G06V 10/70; G06V 10/82; G06F 2209/5011
See application file for complete search history.

(56) References Cited

U.S. PATENT DOCUMENTS 9,934,250 B2 4/2018 Cho et al.
2016/0225053 A1 8/2016 Romley et al.
(Continued)

FOREIGN PATENT DOCUMENTS

KR 10-2016-0118028 A 10/2016
KR 10-2017-0078516 A 7/2017

OTHER PUBLICATIONS

Varga et al. "Fast Content-based Image Retrieval Using Convolutional Neural Network and Hash Function" in 2006 IEEE International Conference on Systems, Man, and Cybernetics (SMC), Oct. 9, 2016, pp. 1-5.
(Continued)

*Primary Examiner* — Stephen G Sherman
(74) *Attorney, Agent, or Firm* — Maschoff Brennan (57) ABSTRACT

The present invention relates to a convolutional artificial neural network-based image and video recognition system, and a method therefor. The recognition system comprises: a mobile device for performing lower layer analysis, transmitting a user question to a server, receiving an answer thereto from the server, and managing the same; the server connected to the mobile device over a network so as to perform data processing in respective neural network layers corresponding to middle and upper layers of a convolutional artificial neural network, and register, analyze, search for, and classify a particular object (image) and video; and a
(Continued)

retriever for comparing an FC layer value for artificial neural network processing of an image and video transmitted by the mobile device with an FC layer value for artificial neural network processing of an image and video registered by a content provider.

6 Claims, 9 Drawing Sheets

(51) Int. Cl.
*G06V 10/70* (2022.01)
*G06V 10/82* (2022.01)

(56) References Cited

U.S. PATENT DOCUMENTS

2016/0342623 A1 11/2016 Hsiao et al.
2017/0185871 A1 6/2017 Zhang et al.

OTHER PUBLICATIONS

Arjun Sharma, et al., "Adapting Off-the-Shelf CNNs for Word Spotting & Recognition," 2015 13th International Conference on Document Analysis and Recognition (ICDAR), pp. 986-990 (2015).
JP Office Action dated Jun. 1, 2021 as received in Application No. 2020-541631.

Image

Convolved Feature

FIG. 10

( Stride 1 )

( Stride 2 )

FIG. 11

CONVOLUTIONAL ARTIFICIAL NEURAL NETWORK BASED RECOGNITION SYSTEM IN WHICH REGISTRATION, SEARCH, AND REPRODUCTION OF IMAGE AND VIDEO ARE DIVIDED BETWEEN AND PERFORMED BY MOBILE DEVICE AND SERVER

TECHNICAL FIELD

The present disclosure relates to a convolutional artificial neural network-based recognition system, and more specifically, to a technology for deriving information for search from an image received from a camera mounted on a mobile device, determining objects by data learning based on a convolutional artificial neural network, generating digital fingerprints of pre-registered data, searching for an object through the convolutional artificial neural network or in-memory tree search technology, and transmitting the information about combination of the target and content to the mobile device to reproduce the content connected to the searched object.

BACKGROUND ART

In general, an artificial neural network refers to an algorithm that simulates the way a human brain recognizes patterns. The artificial neural network interprets visual and auditory input data using perceptrons, classifications, and clusters. Using the result of interpretation, a specific pattern may be recognized from an image, sound, text, or time series data.

Using an artificial neural network may enable various classification and clustering operations, and a desired operation is performed by putting various layers on the data to be classified or clustered.

In each layer, similarity may be obtained by comparing unlabeled data with each other, or by automatically classifying data by training a searcher based on the labeled data.

In more detail, features may be extracted using an artificial neural network, and classification or clustering may be performed using the features as input values for other machine learning algorithms.

Such an artificial neural network includes a deep neural network. The deep neural network refers to a neural network composed of several layers among neural network algorithms.

One layer is composed of multiple nodes, and computation actually occurs at each node. The computation process is designed to simulate the processes that occur in neurons that constitute a human neural network.

A node reacts when it receives a stimulus whose intensity is higher than or equal to a certain intensity, and the intensity of the response is approximately proportional to the value obtained by multiplying an input value by the coefficient (or weights) of the node. In general, a node receives multiple inputs and has as many coefficients as the number of inputs. Therefore, by adjusting the coefficients, different weights may be assigned to multiple inputs.

Finally, all the values obtained through multiplication are added and the sum thereof is input to an activation function as an input. The result of the activation function corresponds to the output of the node. The output value is ultimately used for classification or regression analysis.

Each layer is composed of several nodes, and it is determined whether each node is activated/deactivated according to the input value. Here, the input data is the input of the first layer, and the output from each layer is used as an input to the next layer.

All coefficients continuously change slightly over the course of the training, thereby reflecting an input that is considered to be important by each node. Training the neural network is a process of updating the coefficients.

In the deep neural network, each layer is trained for features of different layers.

In other words, for low-layer features, simple and specific features are learned (e.g., horizontal lines, vertical lines, and diagonal lines forming an image). As features for upper layers, more complex and abstract features (e.g., a human shape, a car shape, a cat shape, a face shape) are learned.

Through this abstraction training process, the deep neural network understands very large, high-dimensional data, and hundreds of millions or billions of coefficients are involved in this process (nonlinear functions are used in this process).

In addition, the deep neural network may use data to identify latent structures of the data. In other words, the latent structures of pictures, text, video, voice, and music (including objects in a picture, the content and emotion of a text, the content and emotion of a voice, etc.). Thereby, even when data is not labeled, similarity between data may be effectively identified. Accordingly, the deep neural network is effective for data clustering.

For example, a neural network may be used to receive a large amount of picture data and group similar pictures together.

The difference of the deep neural network from general machine learning is that feature extraction is performed automatically.

Conventionally, in order to extract effective features, experts in related fields had to devise and apply equations or techniques for directly extracting features for a long time. It takes a lot of time to develop, evaluate and supplement this approach.

Deep neural networks are algorithms designed for computers to perform the affirmation processes. They are trained to perform the processes much faster and more effectively than humans.

Even in training with unlabeled data, neural networks may automatically extract the features of data. There are several methods for this automatic extraction. Usually, this process is learned such that the output obtained through a neural network is the same as the input.

For any kind of label (use of the input/use of a separate label), the neural network finds the correlation between the input and the output. In some cases, after a neural network is trained with labeled data to some extent, training is continued by adding unlabeled data. With this method, performance of the neural network may be maximized.

The final layer of the deep neural network is the output layer. The activation function of the output layer is usually logistic or softmax, and the output layer may finally estimate the probability of a specific label. For example, when a picture is provided as an input, the probability that an object in the picture is a human being, a cat, or a person may be estimated.

The artificial neural network is designed to minimize errors in output.

First, all coefficients of a neural network are initialized before training starts. Then, data is repeatedly input to perform training. If training is performed smoothly, the coefficients will be updated with appropriate values, and various classifications and predictions may be implemented with this artificial neural network.

In the training process, the operation of updating these coefficients occurs repeatedly.

The principle of coefficient update is to estimate the coefficients first, measure the errors that occur when the coefficients are used, and then update the coefficients slightly based on the errors.

Here, multiple coefficients of the neural network are collectively called a model. The model may be in an initialized state or a trained state.

The initialized model does not do any meaningful work. However, as training progresses, the model outputs results similar to real results, rather than arbitrary values.

This is because the artificial neural network does not know anything until data is input. The coefficients are initialized to arbitrary values for the same reason. As the data is read, the coefficients are updated little by little in the right direction.

However, in conventional cases, a specific image is merely used to implement augmented reality based on a feature point descriptor search technique or an artificial neural network training technique for general objects.

In addition, in the conventional technology, a feature point extractor is used for specific object recognition. As a search method using a feature point extractor, the feature point descriptor is trained for classification for general object recognition with the Bag of Words technique or an artificial neural network is used. However, in specific object recognition, the feature point descriptor based search requires a large amount of computation of a mobile device and transmission of a large amount of information to the server. As a result, network traffic may be excessively generated at the server side and the mobile device may be greatly affected by the communication environment.

Further, in general object recognition, the feature point descriptor technique has a low recognition rate, and it may be difficult to combine an artificial neural network structure with the specific object recognition. The conventional techniques have limitations in that they have characteristic information that is not robust to image rotation.

DISCLOSURE

Technical Problem

Therefore, the present disclosure has been made in view of the above problems, and it is one object of the present disclosure to an artificial neural network system that enables fast image search and construction of a large image database by processing specific object recognition and general object recognition in a single process, and is capable of minimizing the computational load of a mobile device and the load on the server.

It is another object of the present disclosure to provide an artificial neural network system capable of increasing a recognition rate by utilizing an artificial neural network having a rotation-invariant characteristic in specific object recognition.

Technical Solution

To achieve these objects and in accordance with one aspect of the present disclosure, provided is a convolutional artificial neural network-based recognition method comprising: a first step S10 of registering, by a content provider, an image target and content in a searcher 7 of a K-D tree structure of a server 5; a second step S20 of photographing, by a user of a mobile device 3, an object with a camera 10 to receive the content registered in the first step S10 and processing, by the mobile device 3, acquired image and video data by layers L1 to L6 corresponding to lower layers of a convolutional artificial neural network; a third step S30 of performing, by the server 5, operations of receiving the data processed in the second step S20, processing the data by layers L7 to L12 corresponding to intermediate and upper layers of the convolutional artificial neural network, determining a main direction of the acquired image and video data, and reproducing a rotation-invariant feature; a fourth step S40 of transmitting, to the K-D tree searcher 7 of the server 5, an FC layer value of a fully-connected layer of the convolutional artificial neural network in the data processed in the third step S30 to search for a nearest target registered by the content provider; a fifth step S50 of comparing similarity of the nearest target with a threshold value and determining whether the target search is successful; and a sixth step S60 of transmitting target-content combination information to the mobile device 3 and reproducing content linked to the searched object.

In accordance with another aspect of the present disclosure, provided is a convolutional artificial neural network-based system comprising: a mobile device 3 configured to perform analysis of a lower layer and to transmit a user's query to from a server 5 and manage the same; the server 5 connected to the mobile device 3 over a network and configured to perform data processing at respective layers of a neural network corresponding to intermediate and upper layers of a convolutional artificial neural network and to register, analyze, search for, and classify a specific object image and video; and a searcher 7 configured to compare an FC layer value of artificial neural network processing of an image and video registered by a content provider with an FC layer value of the artificial neural network processing of an image and video transmitted from the mobile device 3.

Advantageous Effects

A convolutional artificial neural network based recognition system according to an embodiment of the present disclosure has the following advantages.

First, a single complete convolutional artificial neural network is separated into two connected convolutional artificial neural networks, and a neural network corresponding to a lower layer is processed by a mobile device and a neural network corresponding to an upper layer is processed by a server. Accordingly, the amount of data transmitted to the server may be reduced, and thus traffic and communication speed may be improved. In addition, since the mobile device is responsible for a part of the load on the recognition processing, server load may be reduced. Further, since the source data is present in the server, it is easy for a content provider to add new data.

Second, the merits of the general object recognition technique, which is based on image training, and the specific object recognition, which is based on image feature matching, are combined and implemented as a convolutional artificial neural network based recognition system.

That is, in learning a large amount of images through a multilayer convolutional artificial neural network, the lower layer tends to be trained as a layer serving as a feature extractor of conventional feature-based image recognition for extracting feature information about a local region of an image, and a higher the layer tends to be trained as a layer serving to perform semantic search of conventional training-based image recognition and feature matching of conventional feature-based image recognition.

Accordingly, a single complete convolutional artificial neural network may be configured to modify and process the output values of the lower layer and the upper layer. While the output of the upper layer is used for the purpose of understanding the category of objects through the obtained convolutional artificial neural network, the complete convolutional artificial neural network that classifies the categories of objects may be used without using the conventional feature extraction operation, and specific object recognition may be implemented at the same time through only light processing such as comparing the intermediate result values by performing an operation of treating a result of combination of the output values of the lower layer and an intermediate layer as a feature set and pre-registering a specific image, an operation of comparing/matching an image search query with a result of combination of the output values of the same layer for searching, and an operation of determining an appropriate threshold and determining whether the matching result is correct.

Third, a content provider is a person who provides various content such as advertisement, learning, and information to the user. Restrictions on actions to be taken by the user in the process of registering a target for specific object recognition and content connected thereto in the system of the invention registering the content in the pre-designed category on the platform of the invention may be reduced. Accordingly, content may be provided to more users.

Fourth, content may be provided for a product which is not identical but similar to a corresponding product, using the conventional general object recognition. Therefore, content and advertisements may be provided to many users.

Fifth, in the case of providing content by specifying a user who has purchased a product such as a magazine or a language textbook, the user may easily access the content through the specific object recognition technique by providing a page which only a purchaser of the product can access or delivering a printout in the sales process. Thereby, the need to provide a QR code or coupon number may be eliminated.

Sixth, in providing content of products, objects, posters, leaflets, textbooks, magazines, movies, dramas, sports broadcasts, home shopping broadcasts, and the like by a mobile device, a specific object recognition technique, which is a limited object recognition may be extended to general object recognition. Thus, the experience of content may be continuously provided by displaying most objects, situations, and scenes without requiring the user to think about whether the object is a target or not. Thereby, usability may be enhanced and valuable services may be provided. Accordingly, service lock-in of the user may be induced. Thereby, compared to the conventional cases, a number of normal users may be secured. This may be an experience of satisfaction for the users and an opportunity to expand the distribution channel for the content provider.

BEST MODE

Hereinafter, a convolutional artificial neural network-based recognition system in which registration, search, and reproduction of an image and a video are divided between and performed by a mobile device and a server according to an embodiment of the present disclosure will be described in detail.

Figure 1:
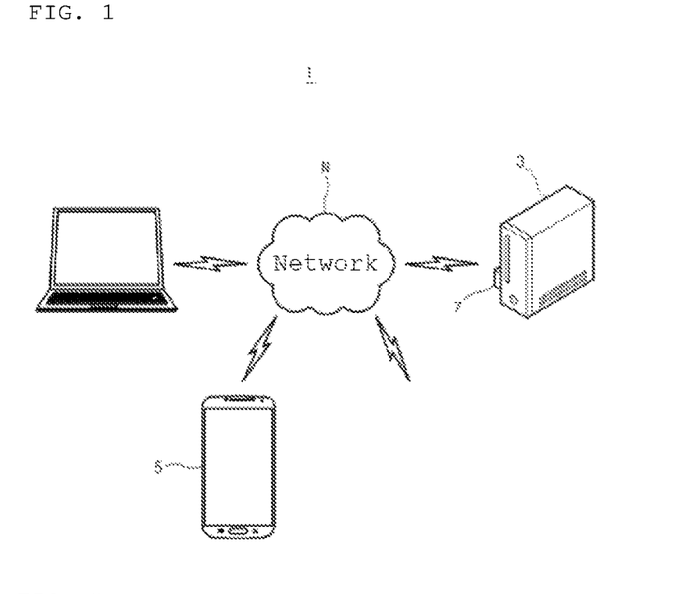
FIG. 1 is a view showing the overall structure of a convolutional artificial neural network-based recognition system according to an embodiment of the present disclosure.
Figure 2:
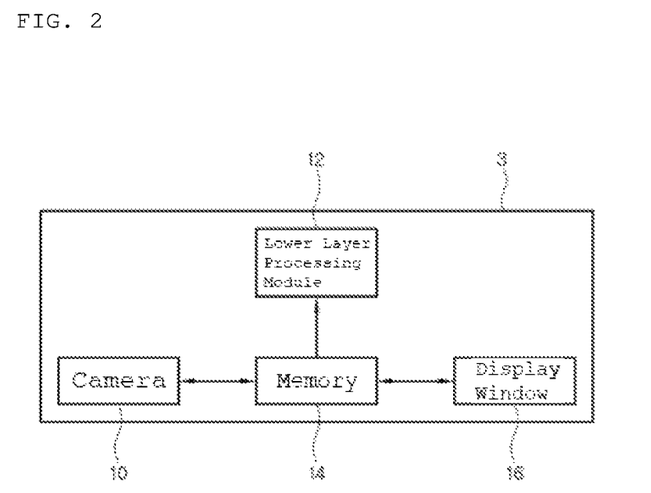
FIG. 2 is a diagram schematically illustrating the structure of a mobile device shown in FIG. 1.
Figure 3:
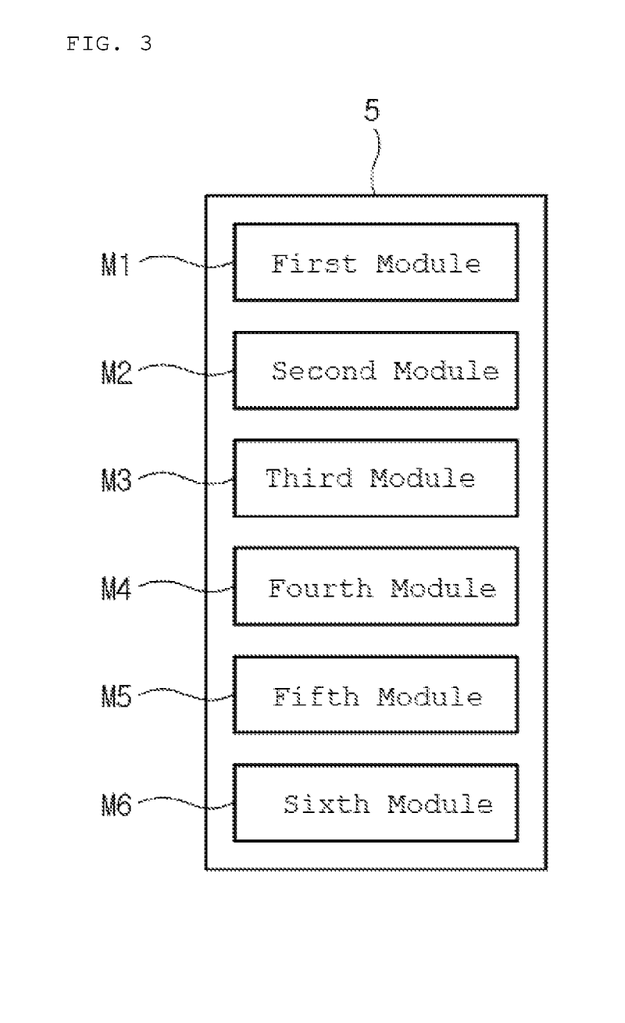
FIG. 3 is a diagram schematically illustrating the structure of a server shown in FIG. 1.

As shown in FIGS. 1 to 3, a system 1 proposed by the present application includes: a mobile device 3 configured to perform analysis of a lower layer and to transmit a user's query to a server 5 and manage the same; the server 5 being connected to the mobile device 3 over a network and configured to perform data processing at respective layers of a neural network corresponding to intermediate and upper layers of a convolutional artificial neural network and to register, analyze, search for, and classify a specific object image and video; and a searcher 7 configured to compare an FC layer value of artificial neural network processing of an image and video registered by a content provider with an FC layer value of the artificial neural network processing of an image and video transmitted from the mobile device 3.

In the system having such a structure, the mobile device 3 represents an apparatus capable of obtaining image or video information and transmit the same over a network. For example, it represents a smartphone, a tablet, or the like.

The mobile device 3 includes a camera 10 configured to acquire a video and an image; a lower layer processing module 12 configured to execute layers 1 to 6, which are lower 2 layers of a convolutional artificial neural network that processes the video and image data acquired by the camera 10; a memory 14 configured to store data processed by the module; and a display window 16 configured to display an image.

The lower layer processing module 12 derives a local region and a size-invariant feature by a typical convolutional artificial neural network.

More specifically, the convolutional neural network includes an input layer, a hidden layer, and an output layer. Here, the hidden layer may be configured as one layer, or may be composed of multiple layers. In the present disclosure, it is composed of six layers.

In addition, each layer is composed of multiple nodes. Each of the nodes has a value. Each node is connected to a front node and a rear node by a weight. The weight represents a connection weight.

In addition, since each layer has an activation function, a corresponding node value is obtained using the value of the previous node, the connection weight of the weight, and the activation function of the previous node.

Figure 4:
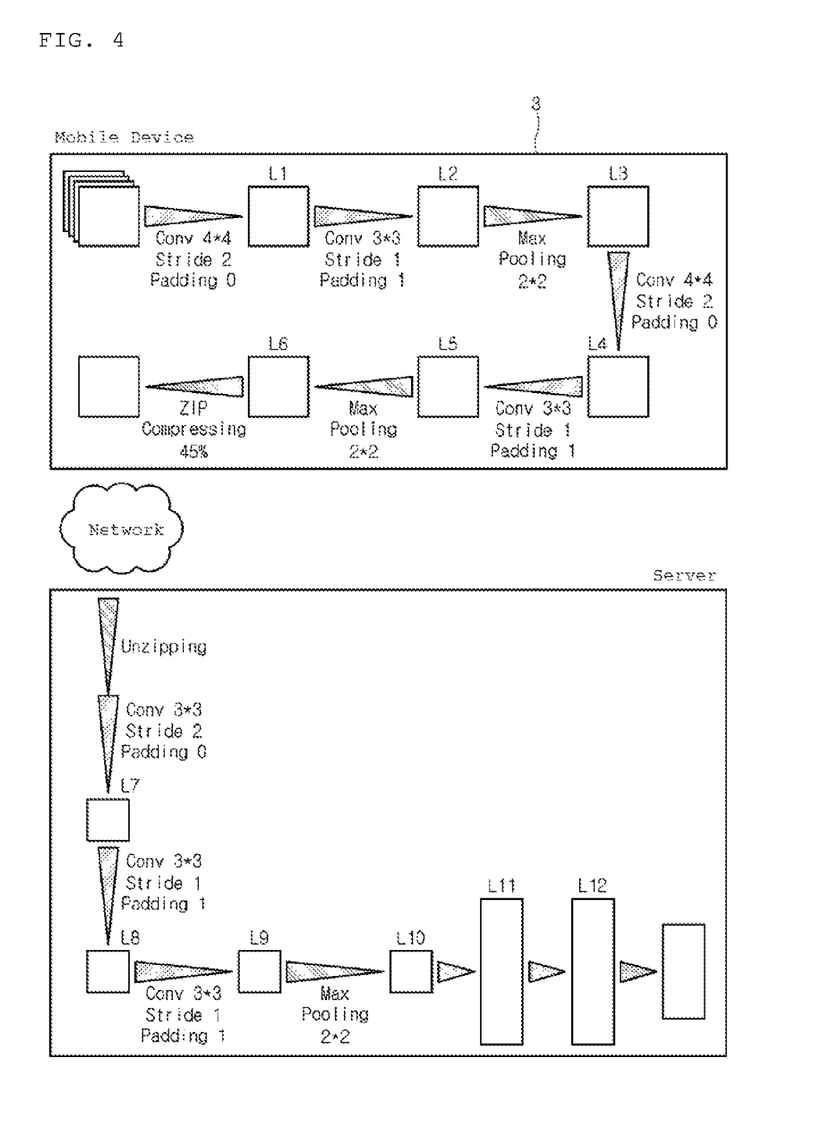
FIG. 4 is a block diagram schematically illustrating a process in which the convolutional artificial neural network is divided into and processed by the mobile device and the server shown in FIG. 1.

The convolutional neural network training process will be described with reference to FIG. 4.

First, image data is input. For example, 3D image data formed by combining a channel with 410*410 pixels is prepared.

Figure 9:
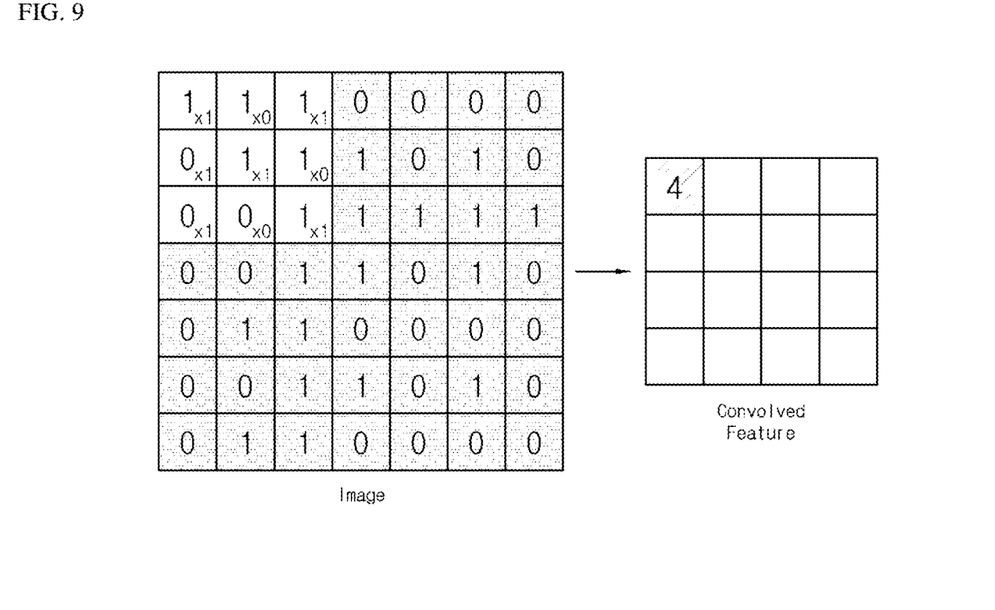
FIG. 9 is a, a 4*4 filter that can be applied to reduce the dimension to a size of 204*204*128 to generate feature maps.

Then, as a first layer L1 is executed, a 4*4 filter is applied to reduce the dimension to a size of 204*204*128 to generate feature maps (see FIG. 9).

As shown in FIG. 9, when necessary, a padding process may be performed. That is, padding is mainly used to adjust the size of output data. For example, when a 3*3 filter is applied to 4*4 input data, the output becomes 2*2 data, which is smaller than the input data by 2.

This may be an issue in a deep neural network that performs convolutional operations multiple times. When the size decreases each time a convolution operation is performed, the size of the output data becomes 1 at a certain time, and thus the convolution operation may no longer be performed. To prevent such a case, a padding process is performed.

Specifically, in the padding process, the periphery of the input data is filled with a specific value, for example, 0, before performing the convolution operation.

That is, the figure below shows a case where padding having a width of 1 is applied to input data of 4*4 size, and one pixel on each of four sides of the input data is filled with a specific value.

Accordingly, padding is added to change the input data having the initial size of 4*4 to 6*6.

As described above, the 4*4 input data is changed to 6*6 by padding. When a 3*3 size filter is applied to the data, output data having the size of 4*4 is generated. While it is illustrated that the padding is set to 1, embodiments are not limited thereto. The padding may be set to 2, 3, or the like.

In the first layer L1 of the present disclosure, padding is zero.

Figure 10:
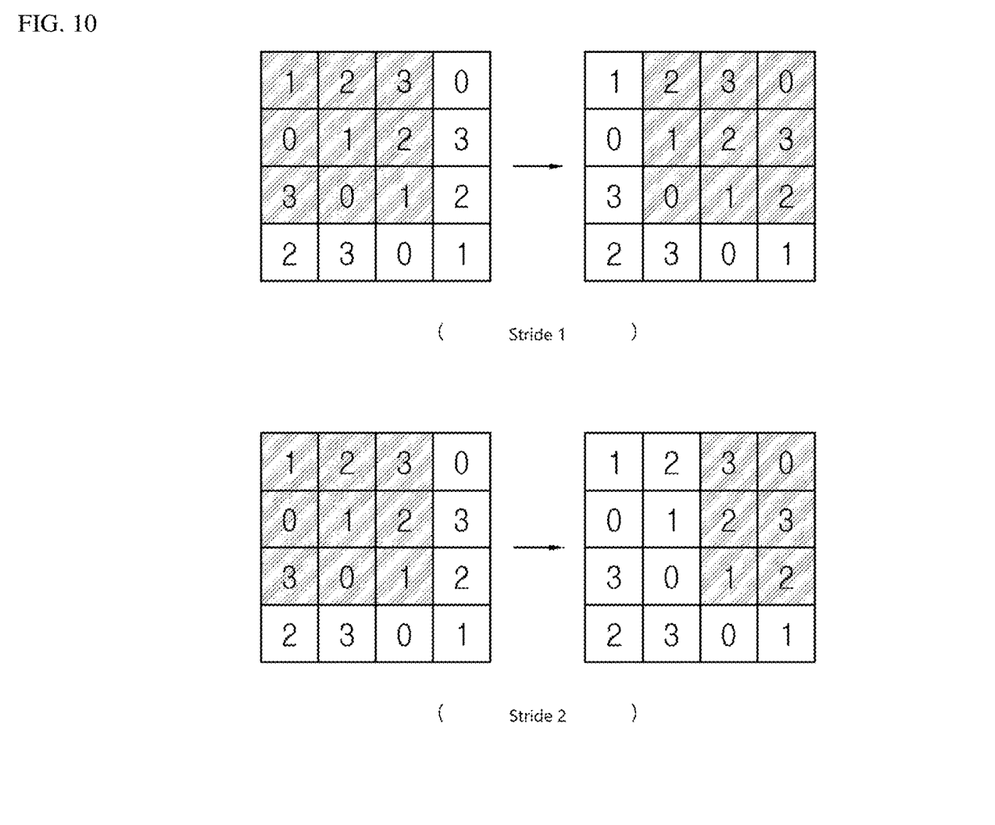
FIG. 10 illustrates an example of generating feature maps by applying a 3*3 filter to the feature maps having a size of 204*204*128.

In addition, a stride may be carried out. The stride refers to an interval between positions where the filter is applied. The stride may be 1 or 2.

For example, as shown in FIG. 10, in the case of stride 1, the window to which the filter is applied is shifted by one cell. In the case of stride 2, the window is shifted by two cells.

In the first layer L1 of the present disclosure, the stride is set to 2.

After executing the first layer L1 in this way, a second layer L2 is executed.

In other words, feature maps are generated by applying a 3*3 filter to the feature maps having a size of 204*204*128. Here, the padding is set to 1, and the stride is set to 1.

After executing the second layer L2, a third layer L3 for performing max pooling is executing.

Figure 11:
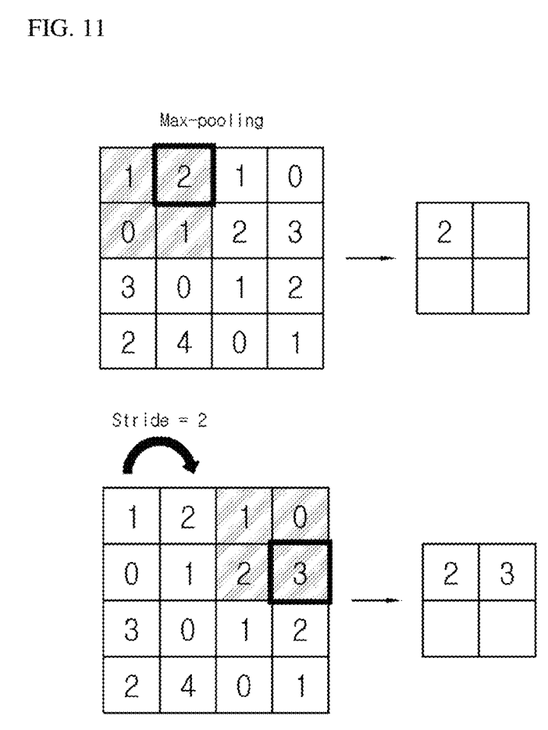
FIG. 11 illustrates an example of the use of pooling to reduce the spatial size of data.

Pooling is used to reduce the spatial size of data, like the padding and stride. The pooling maintains the size of the output data as the size of the input data. The size is adjusted only in the pooling layer, thereby reducing the sensitivity to change in position in an image such that fine parallel translation of the previous layer does not affect the next layer.

That is, as shown in FIG. 11, when the pooling layer takes a specific value or an average of the values in the subdivided layer, for example, a 4*4 block, it takes the greatest value even when some numbers in the 4*4 block change. Accordingly, a small change made in the previous layer does not affect the next layer.

Here, the pooling layer incorporates local parts of the previous layer nodes. In particular, the process of taking the maximum value in the local part is called max pooling.

In addition, in the pooling layer, the window size and stride value of pooling are set to the same value.

In this third layer, max pooling is performed in a 2*2 size to obtain 102*102*128 image data.

After executing the third layer L3 in this way, a fourth layer L4 is executed.

That is, feature maps are generated by applying a 4*4 filter to the feature maps having a size of 102*102*128. Here, padding is set to 0 and the stride is set to 2. Accordingly, feature maps having the size of 50*50*256 are generated.

After executing the fourth layer L4, a fifth layer L5 is executed, and feature maps are generated by applying a 3*3 filter to the 50*50*256 feature maps. Here, the padding is set to 1, and the stride is also set to 1.

Accordingly, feature maps having the size of 50*50*256 are generated.

After executing the fifth layer L5 as described above, a sixth layer L6 is executed by performing max pooling.

That is, by performing max pooling on the feature maps having the size of 50*50*256 to 2*2, image data having the size of 25*25*256 is obtained.

Then, the image data having the size of 25*25*256 is compressed to derive output values. Here, the output values are output in a size of about 336 kb, without being limited thereto. The output values may be appropriately output according to the type of data.

While the mobile device 3 has been described as executing six layers, the present disclosure is not limited thereto. The number of layers may be appropriately changed according to the performance of the mobile device 3.

As described above, the output values to be derived by executing the first to sixth layers L1 to L6 by the mobile device 3 are transmitted to the server 5 to execute seventh to twelfth layers L7 to L12.

Figure 6:
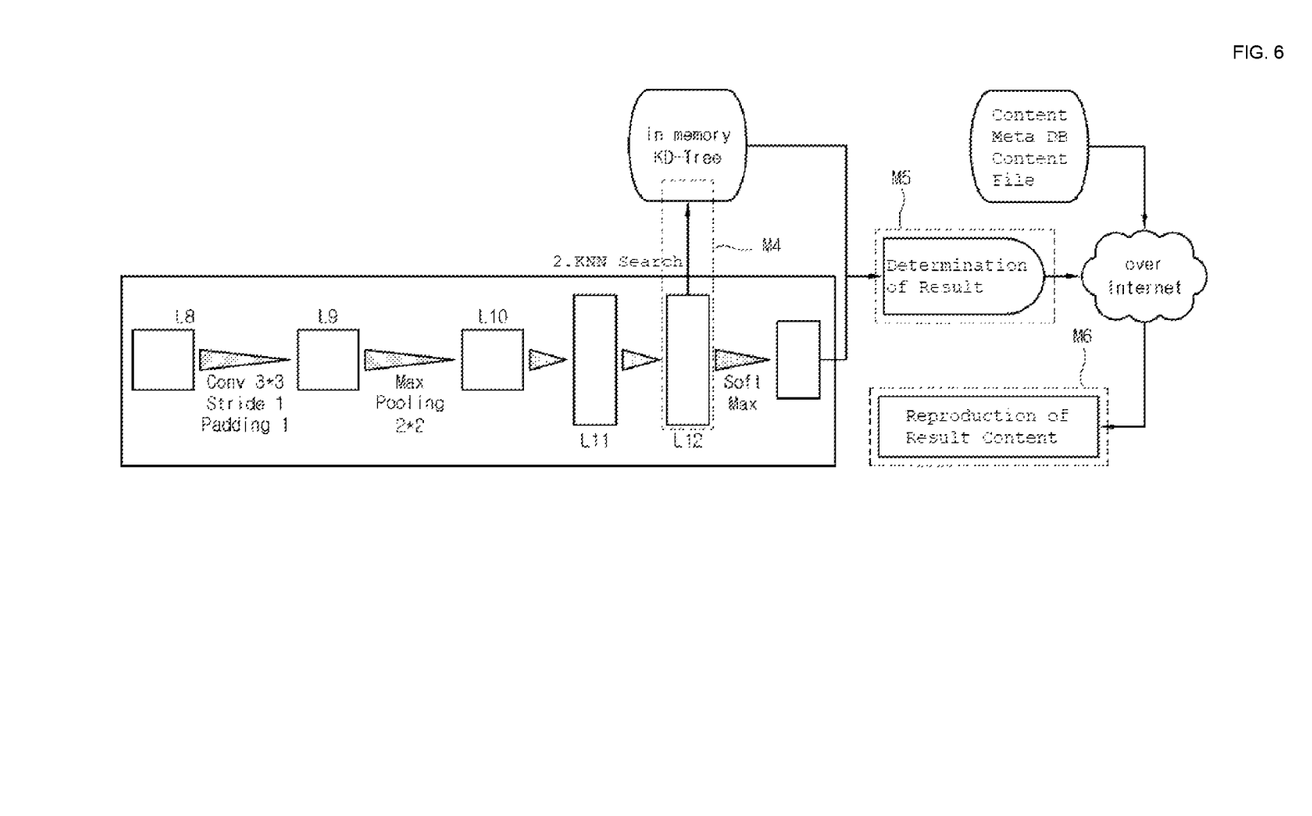
FIG. 6 is a block diagram schematically illustrating a target search and query response process performed by fourth to sixth modules in the mobile device and the server shown in FIG. 1 by the convolutional artificial neural network.

The server 5 includes: a first module M1 configured to determine an output value of the lower layer of the convolutional artificial neural network received from the mobile device 3 in the main direction of the input image and reproduce a rotation-invariant feature; a second module M2 configured to process an image target transmitted from a content provider by an artificial neural network; a third module M3 configured to register information obtained from a feature descriptor layer in the searcher 7 by combining the lower layer information transmitted from the second module M2 in a fully-connected manner; a fourth module M4 configured to carry out search by transmitting the information obtained from the feature descriptor layer to the searcher 7 by fully connecting the lower layer information transmitted from the first module M1 of the mobile device 3; a fifth module M5 configured to determine whether a target search is successful by comparing similarity of the nearest target with a threshold; and a sixth module M6 configured to obtain an input value of the searcher 7 layer for recognizing the shape of a general image and video.

In the server 5 having such a structure, the first module M1 executes seventh to twelfth layers L7 to L12.

That is, when the data transmitted from the mobile device 3 is received by the server 5, the seventh layer L7 is executed, and thus feature maps are generated by applying a 3*3 filter to a feature map having the size of 25*25*256. Here, the padding is set to 0 and the stride is set to 2.

Accordingly, a feature map having the size of 12*12*512 is generated.

After executing the seventh layer L7 as described above, the eighth layer L8 is executed. Thus, feature maps are generated by applying the 3*3 filter to the feature maps having the size of 12*12*512. Here, the padding is set to 1, and the stride is also set to 1.

Accordingly, feature maps having the size of 12*12*512 are generated.

Then, in the ninth layer L9, the same process as performed in the eighth layer L8 is repeated once more.

That is, feature maps are generated by applying the 3*3 filter to the feature maps having the size of 12*12*512. Here, the padding is set to 1, and the stride is also set to 1.

Accordingly, feature maps having the size of 12*12*512 are generated.

After the ninth layer L9 is completed, the tenth layer L10 for max pooling is executed.

That is, by performing max pooling on a feature map of a 12*12*512 size to a 2*2 size, image data having the size of 6*6*512 is obtained.

Thus, after executing the first to tenth layers L1 to L10 by the first module M1, a fully-connected layer is generated in the eleventh layer L11 by the second module M2.

That is, the fully-connected layer refers to a layer in which both the node of the previous layer node and the node of the current layer are connected by weights. Here, the node value may be calculated with connection weights and an activation function.

Since the fully-connected layer connects and combines nodes with weights, the amount of computation increases to process this layer, and accordingly it takes a long time to perform computation in a layer having a large number of nodes. This fully-connected layer is mainly used for the rear part of the hidden layer or the output layer.

As described above, after the fully-connected layer is generated first in the eleventh layer L11, an additional fully-connected layer may be generated in the twelfth layer L12.

Then, after the fully-connected layer is generated in the twelfth layer L12, output values are classified through softmax.

Softmax is mainly used for classification at the output node. That is, softmax is used to calculate the probability obtained by normalizing the sum of all sigmoid values. This is intended to extend logistic regression to multiple categorical variables. That is, in the classification for k category variables, a "probability value" corresponding to a category is calculated.

$$\sigma(z)_j = \frac{e^{z_j}}{\sum_{k=1}^{K} e^{z_k}}$$

In this way, in the twelfth layer L12, general object recognition is performed by finally classifying the output value of the layer output through softmax.

As described above, general object recognition is performed through output values of the lower layers (the first to sixth layers) of the mobile device 3 and the intermediate and upper layers (the seventh to twelfth layers) of the server 5.

Figure 5:
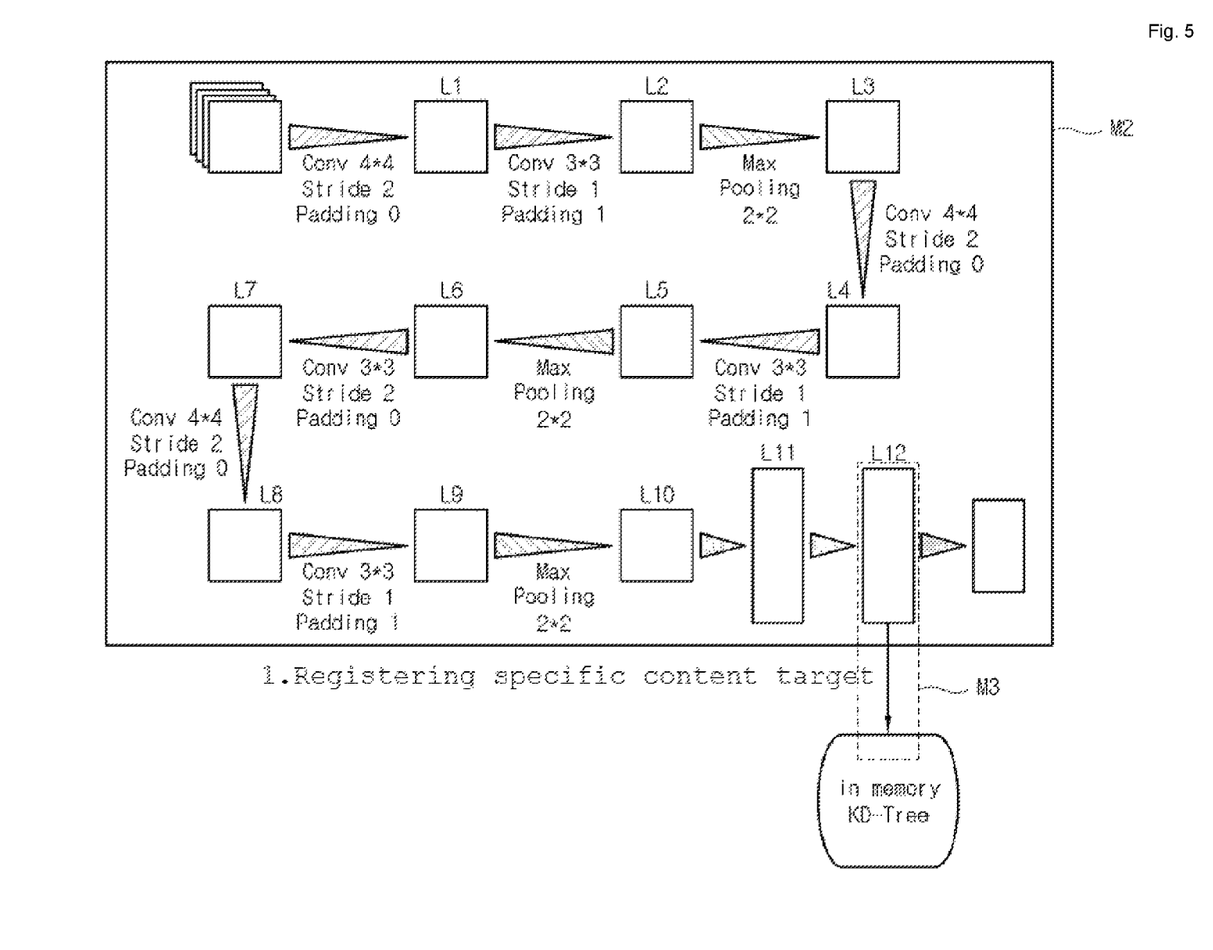
FIG. 5 is a block diagram schematically illustrating a process in which a second module and a third module in the mobile device and the server shown in FIG. 1 process data by the convolutional artificial neural network and register the same with a searcher.

Accordingly, in the present disclosure, not only general object recognition but also specific object recognition is processed by the second module M2 in the same process.

The specific object recognition process is illustrated in FIG. 5, and a content provider registers images with the web server 5.

As illustrated in the figure, the second module M2 is mounted on the web server 5 to process both the lower layers processed by the mobile device 3 and the intermediate and upper layers processed by the server 5.

Since the second module M2 processes all of the first to twelfth layers L1 to L12 consecutively in the same process, a detailed description thereof will be omitted.

Then, the third module M3 registers the nearest target in a KD-Tree searcher 7.

That is, when an image target registration request is made through the administrator web on the server 5, a result value of the FC layer is derived immediately before performing softmax in the twelfth layer L12. The result value is registered with the KD-Tree searcher 7 as a specific content target.

The KD-Tree is an extension of a binary search tree to a multidimensional space. The basic structure and algorithm thereof are similar to those of the binary search tree, but the KD-Tree has a feature of alternate comparison of the level dimensions of the tree.

As methods of searching for a node in the k-d tree, two methods are mainly used. The first method is a range search method. In this method, a range of key values to be searched for is determined and nodes included in the range are searched for.

The second method is nearest neighbor search. In this method, a node closest to a given key value is searched for by dividing a space into both sides of a node using a hypercube.

The fourth module M4 transmits the FC layer value of the twelfth layer L12 to the KD-Tree searcher 7 by fully connecting the lower layer information transmitted from the first module M1 of the mobile device 3 to search for the nearest target.

That is, the second one of the two fully-connected layers transmits feature information of 16 kB (4 Bytes*4096), which is a feature descriptor obtained by full-connected combination of lower layer information, to the searcher 7 of the K-D tree structure.

The fifth module M5 compares the nearest target registered by the content provider with an image transmitted by the user of the mobile device 3 through the KD tree-structured searcher 7 to determine whether the similarity is greater than or equal to or less than a threshold to determine whether the search is successful.

That is, when the similarity of the nearest target is greater than or equal to the threshold, the KD-Tree searcher 7 determines that searching for a target matching specific object recognition is successful.

When it is determined that the search is successful, the operation execution information connected to the image is transmitted to the mobile device 3 to perform the corresponding operation.

Conversely, when the similarity of the nearest target is less than the threshold, the most similar category is selected with a value obtained by applying softmax to the output value of the twelfth layer L12.

When it is determined that there is no similar image, an output of the layer of the searcher 7 for recognizing the shape of a general object (image) is obtained to determine the corresponding general object and determine whether a prediction value predicting a general object (a person, dalmatian, rose, computer, or the like) is greater than or equal to a threshold value. When the prediction value is greater than or equal to the threshold value, the corresponding operation execution information is transmitted to the mobile device.

Here, when the corresponding operation execution information is not found, the no-operation state is transmitted to the mobile device 3.

Then, the standard deviation of the values obtained from the layer that derives the characteristics of the local area is estimated. When the value of the standard deviation is less than or equal to a threshold value, or the search result received from the server 5 is No Operation, the result value of the last processed convolutional neural network is temporarily stored, and then a new image is acquired from the camera 10 of the mobile device 3. When the difference between the acquired image and the processing result of a previous frame is less than a threshold, the acquired new frame data is ignored.

The sixth module M6 reproduces the content connected to the target. Thus, the module links the content pre-registered by the content provider to a related target to reproduce the content on the mobile device 3.

When the conventional specific object recognition technique is used, the user should have an object to be recognized, such as a leaflet, a poster, or a product package, and an action flow leading to search for the object using the mobile device 3 from an action of recognizing the object as a search object is required. In this case, accessibility is restricted in the advertisement area targeting multiple unspecified people.

In addition, even if a product is not purchased, it should be mentioned that the product is being held now and registered with a system such that the product may be searched through a printed guide or the like.

On the other hand, the present disclosure may provide content to more users by providing content even for similar products in the same category using "general object recognition" in addition to the existing method although the products are not the desired product.

In addition, in some cases, content may be provided for a specific target. In particular, in providing content specifically for a user who purchases a product such as a magazine or a language textbook, the conventional general object recognition technique is not applicable, and thus a QR code or a coupon number is conventionally provided to the user. This issue can be addressed by providing a page that can be accessed only by purchasers of the product or delivering printed materials in the sales process based on the specific object recognition technique.

When the mobile device 3 can acquire location information, for example, when the user has granted permission and GPS satellite signals are acquired or information from which location information can be guessed can be received by Beacon or Wi-Fi, the location information may be sent to the server 5 as auxiliary information for the search request information, and the server 5 may determine whether to allow the operation by determining whether the location is restricted in the operation execution information of the search result.

When the operation is restricted, the operation restriction information is sent together with the recognition result to the mobile device 3 to indicate to the user that the operation is restricted through the mobile device 3.

Hereinafter, a method of recognizing an image and a video by an artificial neural network system according to a preferred embodiment of the present disclosure will be described in more detail.

Figure 7:
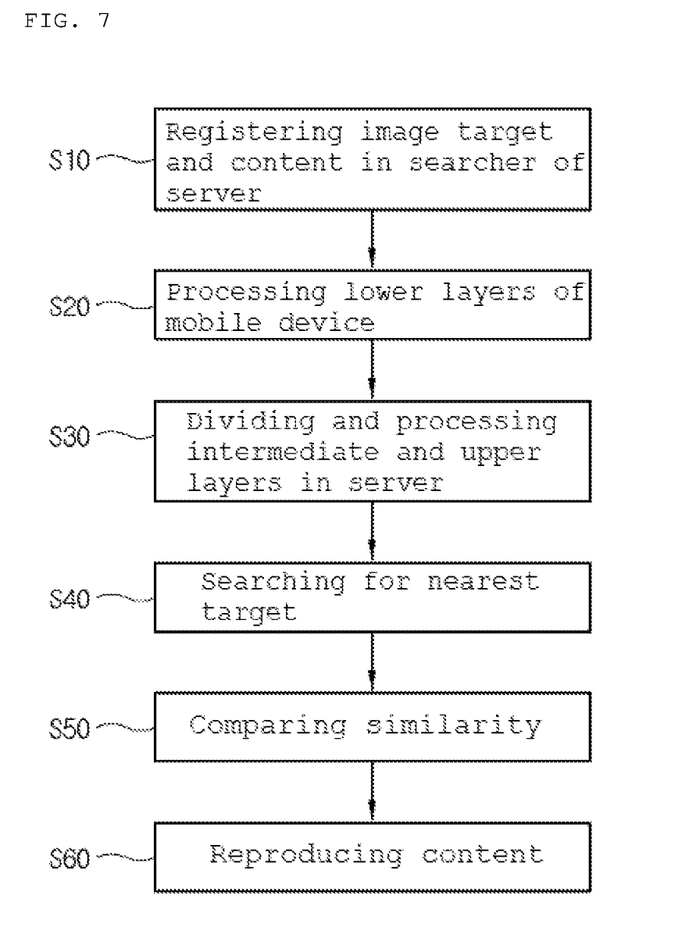
FIG. 7 is a flowchart illustrating a convolutional artificial neural network-based recognition method according to another embodiment of the present disclosure.

An artificial neural network-based recognition method provided by the present invention includes:

a first step S10 of registering, by a content provider, an image target and content in the searcher 7 of a K-D tree structure of the server 5; a second step S20 of photographing, by a user of a mobile device 3, an object with a camera 10 to receive the content registered in the first step S10 and processing, by the mobile device 3, acquired image and video data by layers L1 to L6 corresponding to lower layers of a convolutional artificial neural network; a third step S30 of performing, by the server 5, operations of receiving the data processed in the second step S20, processing the data by layers L7 to L12 corresponding to intermediate and upper layers of the convolutional artificial neural network, determining a main direction of the acquired image and video data, and reproducing a rotation-invariant feature; a fourth step S40 of transmitting, to the K-D tree searcher 7 of the server 5, an FC layer value of a fully-connected layer of the convolutional artificial neural network in the data processed in the second step S20 to search for a nearest target registered by the content provider; a fifth step S50 of comparing similarity of the nearest target with a threshold value and determining whether the target search is successful; and a sixth step S60 of transmitting target-content combination information to the mobile device 3 and reproducing content linked to the searched object.

According to the image and video recognition method configured in the above-described order, in the first step S10, the content provider registers an image target and the content in the K-D tree searcher 7 of the web server 5.

In the first step S10, at least one layer configured to prepare image data in the web server 5, apply a filter to the data, and carry out padding and a stride to generate feature maps is executed. In addition, a layer to carry out Max pooling at least once, apply a filter to the data processed through the Max pooling, and carry out padding and a stride to generate feature maps is additionally executed.

More specifically, the web server 5 inputs image data, and prepares, for example, three-dimensional image data in which a channel is added to 410*410 pixels.

Then, as a first layer L1 is executed to apply a 4*4 filter to reduce the dimension to a size of 204*204*128 to generate feature maps.

Here, when necessary, a padding process may be performed. That is, padding is mainly used to adjust the size of output data. For example, when a 3*3 filter is applied to 4*4 input data, the output becomes 2*2 data, which is smaller than the input data by 2.

Specifically, in the padding process, the periphery of the input data is filled with a specific value, for example, 0 before performing the convolution operation.

Accordingly, padding is added to change the input data having the initial size of 4*4 to 6*6.

As described above, the 4*4 input data is changed to 6*6 by padding. When a 3*3 filter is applied to the data, output data having the size of 4*4 is generated. In the first layer L1 of the present disclosure, padding is set to 0.

In addition, a stride may be carried out. The stride refers to an interval between positions where the filter is applied. The stride may be 1 or 2. In the first layer L1 of the present disclosure, the stride is set to 2.

After executing the first layer L1 in this way, a second layer L2 is executed.

In other words, feature maps are generated by applying a 3*3 filter to a 204*204*128 feature map. Here, the padding is set to 1, and the stride is also set to 1.

After executing the second layer L2, a third layer L3 for performing Max pooling is executed.

Pooling is used to reduce the spatial size of data, like the padding and stride. Pooling maintains the size of the output data as the size of the input data. The size is adjusted only in the pooling layer, thereby reducing the sensitivity to change in position in an image such that fine parallel translation of the previous layer does not affect the next layer.

Here, the pooling layer incorporates local parts of the previous layer nodes. In particular, the process of taking the maximum value in the local part is called Max pooling.

In addition, in the pooling layer, the window size and the stride value of pooling are set to the same value.

In this third layer, max pooling is performed in a 2*2 size to obtain 102*102*128 image data.

After executing the third layer L3 in this way, a fourth layer L4 is executed.

That is, feature maps are generated by applying a 4*4 filter to the feature map having the size of 102*102*128. Here, padding is set to 0 and the stride is set to 2. Accordingly, feature maps having the size of 50*50*256 are generated.

After executing the fourth layer L4, a fifth layer L5 is executed, and feature maps are generated by applying a 3*3 filter to the 50*50*256 feature maps. Here, the padding is set to 1, and the stride is also set to 1.

After executing the fifth layer L5 as described above, a sixth layer L6 is executed by performing Max pooling.

That is, by performing Max pooling on the feature maps having the size of 50*50*256 to 2*2, image data having the size of 25*25*256 is obtained.

Then, in a seventh layer L7, feature maps are generated by applying a 3*3 filter to the feature maps having the size of 25*25*256. Here, the padding is set to 0 and the stride is set to 2.

Accordingly, feature maps having the size of 12*12*512 are generated.

After executing the seventh layer L7 as described above, an eighth layer L8 is executed, and feature maps are generated by applying a 3*3 filter to the feature maps having the size of 12*12*512. Here, the padding is set to 1, and the stride is also set to 1.

Accordingly, feature maps having the size of 12*12*512 are generated.

Then, in a ninth layer L9, the same process as performed in the eighth layer L8 is repeated once more.

That is, feature maps are generated by applying the 3*3 filter to the feature maps having the size of 12*12*512. Here, the padding is set to 1, and the stride is also set to 1.

Accordingly, feature maps having the size of 12*12*512 are generated.

After the ninth layer L9 is completed, a tenth layer L10 for Max pooling is executed.

That is, by performing Max pooling on a feature map of a 12*12*512 size to a 2*2 size, image data having the size of 6*6*512 is obtained.

After executing the tenth layer L10 in this way, a fully-connected layer is generated in an eleventh layer L11.

In addition, after the fully-connected layer is generated, an additional fully-connected layer may be generated in a twelfth layer L12.

Then, after the fully-connected layer is generated in the twelfth layer L12, output values are classified through softmax.

In this way, in the twelfth layer L12, general object recognition is performed by finally classifying the output value of the layer output through softmax.

Then, the FC layer value of the secondary fully-connected layer is stored in the searcher 7 of the K-D tree structure stored in the memory 14 of the web server 5, thereby being registered.

Thus, when the first step S10 of registering the image and video provided by the content provider in the KD tree-structure searcher 7 of the web server 5 is completed, a normal consumer may recognize an object by photographing the object with the camera 10 of the mobile device 3 that the consumer carries, and be provided with the content through the second to sixth steps S20-S60.

First, in the second step S20, the user of the mobile device 3 photographs the object with the camera 10 (S21), and the acquired image and video data are processed by the lower layers L1 to L6 of the convolutional artificial neural network (S22) (S23).

The lower layer processing of the second step S20 is the same as the lower layer processing of the first step S10, except that it is performed in the mobile device 3.

Specifically, image data is acquired by photographing an object with the camera 10 mounted on the mobile device 3 (S21).

Then, in the first layer L1, based on the image data, feature maps are generated by applying a filter, and padding and stride are carried out, and a filter in the second layer L2). In the second layer L2, feature maps are generated once more by applying a filter, and padding and stride are carried out.

Then, max pooling is performed in the third layer L3. Then, in the fourth layer L4, feature maps are generated once again, and padding and stride are carried out.

In the fifth layer L5, feature maps are generated in the same manner. Padding and stride are carried out. In the sixth layer L6, max pooling is performed, and padding and stride are carried out.

After completing the second step S20 in this way, the third step S30 is performed.

In the third step S30, data processed in the mobile device 3 in the second step S20 is transmitted to the server 5 and processed by the intermediate and upper layers. Here, the processing of the intermediate and upper layers, which is performed in the server 5, is the same as that of the upper layer of the process in which the content provider registers an image in the server 5 in the first step S10.

That is, in the seventh layer L7, feature maps are generated once more by applying a filter to a feature map. In this operation, padding and stride are carried out.

After performing the seventh layer L7) as described above, the eighth layer L8) is performed, so that the feature map is generated once more by applying a filter. In this operation, padding and stride are also carried out.

Then, in the ninth layer L9, feature maps are generated by repeating the same process as in the eighth layer L8.

In the tenth layer L10, max pooling is performed. Then, a primary fully-connected layer is generated in the eleventh layer L11, and a secondary fully-connected layer is generated in the twelfth layer L12.

Then, after the fully-connected layer is generated in the twelfth layer L12, general object recognition is performed by classifying the output values through softmax.

After the third step S30 is completed, the fourth step S40 performed. Thus, the FC layer value of the twelfth layer L12 is transmitted to the KD tree searcher 7 mounted on the memory 14 (S32), and the nearest target registered by the content provider is searched (S41).

After the fourth step S40 is completed, the fifth step S50 is performed.

Figure 8:
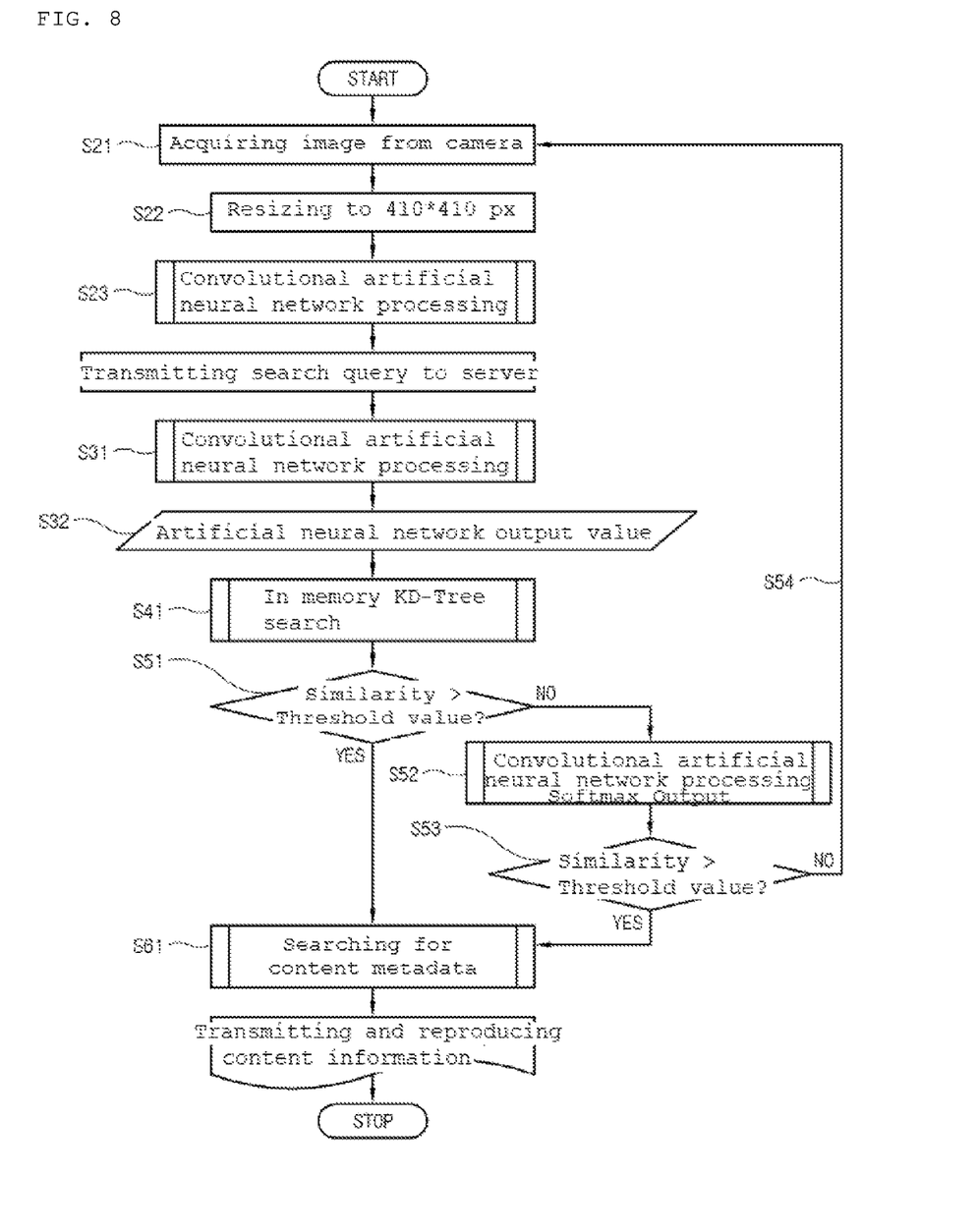
FIG. 8 is a flowchart illustrating a process of determining a result of a search query and reproducing content by the mobile device.

In the fifth step S50, the FC layer value of the image input to the K-D tree searcher 7 is compared with similarity of the nearest target pre-registered by the content provider (S51).

When the similarity of the nearest target is greater than or equal to the threshold value, it is determined that the search for a target matching the specific object recognition is successful (S61).

On the other hand, when the similarity of the nearest target is less than the threshold value, the most similar category is selected based on a value obtained by applying softmax to the output value of the twelfth layer L12 from the third step S30 (S52).

When the similarity is greater than the threshold value as a result of comparing the similarity of the selected category with the threshold (S53), content metadata is searched and reproduced (S61). When the similarity is less than or equal to the threshold value, a new image is acquired by the camera 10 (S54).

In other words, when it is determined that there is no similar image, the output of the layer of the searcher 7 for recognizing the shape of a general object (image) is obtained to determine the general object. Then, it is determined whether an estimated guess value for the general object (person, dalmatian, rose, computer, etc.) is greater than or equal to a threshold value. When the guess value is greater than or equal to the threshold value, corresponding operation execution information is transmitted to the mobile device.

Here, when the corresponding operation execution information is not found, the No Operation state is transmitted to the mobile device 3.

Then, the standard deviation of the values obtained from the layer that derives the characteristics of the local area is estimated. When the value of the standard deviation is less than or equal to a threshold value, or the search result received from the server 5 is No Operation, the result value of the last processed convolutional neural network is temporarily stored, and then a new image is acquired from the camera 10 of the mobile device 3. When the difference between the acquired image and the processing result of a previous frame is less than a threshold, the acquired new frame data is ignored.

After the fifth step S50 is completed as described above, the sixth step is performed.

In the sixth step S60, a process of reproducing the content connected to the target is performed. The content registered by the content provider is reproduced on the mobile device 3 by linking the content to a related target.

INDUSTRIAL APPLICABILITY

The present invention relates to a convolutional artificial neural network-based recognition system. More specifically, the present invention is applicable in the field of technology for deriving information for search from an image received from a camera mounted on a mobile device, determining objects by data learning based on a convolutional artificial neural network, generating digital fingerprints of pre-registered data based on the convolutional artificial neural network, searching for an object through the convolutional artificial neural network or in-memory tree search technology, and transmitting the information about combination of the target and content to the mobile device to reproduce the content connected to the searched object.

The invention claimed is:

1. A convolutional artificial neural network-based recognition method comprising:
   a first step of registering, by a content provider, an image target and content in a searcher of a K-D tree structure of a server;
   a second step of photographing, by a user of a mobile device, an object with a camera to receive the content registered in the first step and processing, by the mobile device, acquired image and video data by layers LI to L6 corresponding to lower layers of a convolutional artificial neural network;
   a third step of performing, by the server, operations of receiving the data processed in the second step, processing the data by layers L7 to L12 corresponding to intermediate and upper layers of the convolutional artificial neural network, determining a main direction of the acquired image and video data, and reproducing a rotation-invariant feature;
   a fourth step of transmitting, to the K-D tree searcher f of the server, an FC layer value of a fully-connected layer of the convolutional artificial neural network in the data processed in the third step to search for a nearest target registered by the content provider;
   a fifth step of comparing similarity of the nearest target with a threshold value and determining whether the target search is successful; and
   a sixth step of transmitting target-content combination information to the mobile device and reproducing content linked to the searched object.

2. The method of claim 1, wherein, in the first step, the image target and content are registered in the searcher by sequentially executing a plurality of layers through the convolutional artificial neural network included in the server, wherein the plurality of layers comprises:
at least one layer configured to prepare image data in the web server and generate feature maps by applying a filter to the data and carrying out padding and a stride;
a layer configured to perform max pooling for a first time;
at least one layer configured to generate feature maps by applying a filter to the max-pooled data and carrying out padding and a stride;
a layer configured to perform the max pooling for a second time;
at least one layer configured to generate feature maps by applying a filter to the max pooled data and carrying out padding and a stride;
a layer configured to perform the max pooling for a third time;
at least one fully-connected layer;
a layer configured to register the FC layer value of the fully-connected layer by storing the FC layer value in the searcher of the K-D tree structure stored in the memory of the web server; and
a layer configured to classify an output value of the fully-connected layer through softmax for the output value.

3. The method of claim 1, wherein in the second step, the mobile device processes the image and video data by the convolutional artificial neural network and transmits the data to the server, the second step comprising:
acquiring an image and a video by the camera of the mobile device;
executing at least one layer configured to apply a filter to the acquired image and
video data and carry out padding and a stride to generate feature maps;
performing max pooling for a first time;
applying a filter to the max-pooled data and carrying out padding and a stride to generate feature maps;
performing max the max pooling for a second time;
executing at least one layer configured to generate feature maps by applying a filter to the max pooled data and carrying out padding and a stride.

4. The method of claim 3, wherein in the third step, the rotation-invariant reproduction is processed by the convolutional artificial neural network, the third step comprising:
generating a feature map by applying a filter to the data transmitted from the mobile device to the server and carrying out padding and a stride;
executing the max pooling for a third time;
executing at least one fully-connected layer;
classifying an output value of the fully-connected layer through softmax for the output value.

5. The method of claim 1, wherein in the fifth step, in determining whether the target search is successful, when the similarity of the nearest target is greater than or equal to a threshold value, it is determined that search for a target matching specific object recognition is successful, and
wherein, when the similarity of the nearest target is less than the threshold value, a similar category is selected based on a value obtained by applying softmax to an output value.

6. The method of claim 5, wherein in the fifth step, in determining whether the target search is successful, when similarity of the selected category is greater than the threshold value as a result of comparing the similarity with the threshold value, content metadata is searched and reproduced, and
when the similarity is less than or equal to the threshold value, a new image is acquired by the camera.

* * * * *